United States Patent
Kim et al.

(10) Patent No.: US 12,413,087 B2
(45) Date of Patent: Sep. 9, 2025

(54) APPARATUS AND METHOD FOR CONTROLLING BIDIRECTIONAL ON BOARD CHARGER OF ELECTRIC VEHICLE

(71) Applicants: Hyundai Motor Company, Seoul (KR); Kia Corporation, Seoul (KR)

(72) Inventors: Jae Hyun Kim, Incheon (KR); Sung Uk Park, Busan (KR); Hyun-Wook Seong, Hwaseong-si (KR); Dong Gyun Woo, Hwaseong-si (KR)

(73) Assignees: Hyundai Motor Company, Seoul (KR); Kia Corporation, South (KR)

( * ) Notice: Subject to any disclaimer, the term of this patent is extended or adjusted under 35 U.S.C. 154(b) by 676 days.

(21) Appl. No.: 17/672,985

(22) Filed: Feb. 16, 2022

(65) Prior Publication Data
US 2023/0025134 A1 Jan. 26, 2023

(30) Foreign Application Priority Data
Jul. 23, 2021 (KR) .......... 10-2021-0097308

(51) Int. Cl.
| | |
|---|---|
| *H02J 7/00* | (2006.01) |
| *B60L 53/16* | (2019.01) |
| *B60L 53/22* | (2019.01) |
| *B60L 53/60* | (2019.01) |
| *B60L 55/00* | (2019.01) |
| *H02J 3/32* | (2006.01) |
| *H02J 7/06* | (2006.01) |
| *H02J 7/14* | (2006.01) |
| *H02M 1/42* | (2007.01) |

(52) U.S. Cl.
CPC .......... *H02J 7/00712* (2020.01); *B60L 53/16* (2019.02); *B60L 53/22* (2019.02); *B60L 53/60* (2019.02); *B60L 55/00* (2019.02); *H02J 3/322* (2020.01); *H02J 7/06* (2013.01); *H02M 1/4233* (2013.01); *B60L 2210/10* (2013.01); *H02J 2207/20* (2020.01); *H02J 2310/48* (2020.01)

(58) Field of Classification Search
CPC .......... B60L 53/60; B60L 53/22; B60L 53/16; B60L 55/00; H02J 7/00712; H02J 2207/20
USPC .................................................. 320/134, 109
See application file for complete search history.

(56) References Cited

U.S. PATENT DOCUMENTS

| | | | |
|---|---|---|---|
| 11,383,607 B1* | 7/2022 | Prasad ..................... | B60L 53/24 |
| 11,813,947 B1* | 11/2023 | Pathipati ................. | H02J 50/90 |
| 11,975,628 B1* | 5/2024 | Pathipati ................. | B60L 53/66 |
| 2016/0016479 A1* | 1/2016 | Khaligh .............. | H02M 1/4258 |
| | | | 336/170 |
| 2016/0031330 A1* | 2/2016 | Ishigaki .................. | H02J 7/342 |
| | | | 307/20 |
| 2016/0176310 A1* | 6/2016 | Sato ........................ | B60L 53/00 |
| | | | 180/65.25 |
| 2016/0268917 A1* | 9/2016 | Ramsay ............ | H02M 7/53871 |
| 2018/0254732 A1* | 9/2018 | Smolenaers .............. | H02J 1/12 |

(Continued)

*Primary Examiner* — Alexis B Pacheco
(74) *Attorney, Agent, or Firm* — Slater Matsil, LLP

(57) ABSTRACT

An embodiment apparatus for an electric vehicle includes an indoor power outlet configured to receive power through one of a plurality of lines except for a single-phase alternating current (AC) charging line among three-phase AC input lines, a sensor configured to measure a required current of an electronic device connected to the indoor power outlet, and a controller configured to control a bidirectional on board charger of the electric vehicle based on the required current.

18 Claims, 15 Drawing Sheets

(56) References Cited

U.S. PATENT DOCUMENTS

| | | | |
|---|---|---|---|
| 2020/0062138 A1* | 2/2020 | Smolenaers | B60L 55/00 |
| 2020/0070672 A1* | 3/2020 | Vahedi | H02M 7/219 |
| 2020/0122585 A1* | 4/2020 | Bhat | G05B 19/0426 |
| 2020/0171955 A1* | 6/2020 | Bae | H02J 13/00004 |
| 2020/0212816 A1* | 7/2020 | Sun | H02J 7/0018 |
| 2020/0282853 A1* | 9/2020 | Paryani | B60L 53/22 |
| 2020/0298722 A1* | 9/2020 | Smolenaers | H02J 7/345 |
| 2021/0188106 A1* | 6/2021 | Asa | H02M 5/293 |
| 2021/0402887 A1* | 12/2021 | Prasad | B60L 50/60 |
| 2022/0009373 A1* | 1/2022 | Patel | H02J 7/0047 |
| 2022/0032796 A1* | 2/2022 | Salter | B60L 50/66 |
| 2022/0158464 A1* | 5/2022 | Ibrahim | B60L 53/20 |
| 2022/0216791 A1* | 7/2022 | Tanaka | G01R 31/40 |
| 2022/0281340 A1* | 9/2022 | Lu | B60L 55/00 |
| 2022/0379760 A1* | 12/2022 | Pathipati | B60L 53/30 |
| 2022/0402390 A1* | 12/2022 | Smolenaers | H02J 3/322 |

* cited by examiner

APPARATUS AND METHOD FOR CONTROLLING BIDIRECTIONAL ON BOARD CHARGER OF ELECTRIC VEHICLE

CROSS-REFERENCE TO RELATED APPLICATIONS

This application claims the benefit of Korean Patent Application No. 10-2021-0097308, filed on Jul. 23, 2021, which application is hereby incorporated herein by reference.

TECHNICAL FIELD

The present disclosure relates to a technology for controlling a bidirectional on board charger (OBC) provided in an electric vehicle.

BACKGROUND

In general, an electric vehicle obtains driving energy of an electric motor from a high voltage battery. When the state of charge (SOC) of the high voltage battery is lower than a reference value, charging must be performed through bidirectional electric vehicle service equipment (EVSE).

The high voltage battery provided in such an electric vehicle may operate as an energy storage system (ESS). For this reason, an electric vehicle may be equipped with a vehicle to grid (V2G) mode in which the power of the high voltage battery is supplied to a power network and a vehicle to load (V2L) mode in which the power of the high voltage battery is supplied to various electronic devices (e.g., home electronic devices). In this case, home electronic devices include a laptop computer, a fan, a refrigerator, a washing machine, a TV, an electric heater, an electric rice cooker, a microwave oven, and the like.

An electric vehicle must necessarily have a bidirectional OBC to operate in a charging mode, V2G mode or V2L mode. The bidirectional OBC may receive 3-phase AC (alternating current) or single-phase AC from the bidirectional EVSE. In this case, a line through which the power of a high voltage battery is supplied to a power outlet (hereinafter, referred to as an indoor power outlet) provided inside an electric vehicle is branched from the line receiving the single-phase AC input. Therefore, the bidirectional OBC cannot measure the required current of the indoor power outlet.

According to the conventional technique for controlling the bidirectional OBC of such an electric vehicle, when the single-phase AC input line is in use (in a charging mode in which the single-phase AC input line is used), because the sum of the charging power of the high voltage battery and the required power of the indoor power outlet may exceed the supply power of EVSE, it is necessary to block the power supply to the indoor power outlet. That is, according to the related art, it is impossible to supply power to the indoor power outlet through a single-phase AV input line while operating in a charging mode. In this case, when the required power of the electric vehicle exceeds the power supplied by the EVSE, the EVSE stops the operation.

In addition, according to the related art, because only the same voltage as the voltage supplied from the EVSE is supplied to the indoor power outlet, when the voltage (e.g., 240 V) supplied from the EVSE is different from the rated voltage (e.g., 120 V) of the electronic device connected to the indoor power outlet, it is possible to cause damage to the electronic device.

In addition, according to the related art, because it is impossible to measure the required current of the indoor power outlet, although power of 3.7 kW can be supplied to each of the indoor power outlet and the outdoor power outlet, the sum of the power supplied to the indoor power outlet and the power supplied to the outdoor power outlet is limited to 3.7 kW.

The matters described in this background section are intended to promote an understanding of the background of the disclosure and may include matters that are not already known to those of ordinary skill in the art.

SUMMARY

Embodiments of the present disclosure can solve problems occurring in the prior art while advantages achieved by the prior art are maintained intact.

Embodiments of the present disclosure provide an apparatus and a method for controlling a bidirectional on board charger (OBC) of an electric vehicle, in which the line supplying power to the indoor power outlet of the electric vehicle is branched from a line except for a single-phase AC charging line among three-phase AC input lines, and which measures the required current of the electronic device connected to the indoor power outlet and controls the bidirectional OBC based on the required current, so that power can be supplied to the electric vehicle connected to the indoor power outlet while the electric vehicle operates in a charging mode or vehicle to grid (V2G) mode, and both the power consumption of the indoor power outlet and the power consumption of the outdoor power outlet can be improved.

The technical features of embodiments of the present disclosure are not limited to the above-mentioned ones, and the other unmentioned technical features and advantages will become apparent from the following description. Also, it may be easily understood that the features and advantages of embodiments of the present disclosure may be realized by the units and combinations thereof recited in the claims.

According to an embodiment of the present disclosure, an apparatus for controlling a bidirectional OBC of an electric vehicle includes an indoor power outlet that receives power through a line except for a single-phase AC charging line among three-phase alternating current input lines, a sensor that measures a required current of an electronic device connected to the indoor power outlet, and a controller that controls the bidirectional OBC based on the required current.

According to an embodiment of the present disclosure, the bidirectional OBC may include a three-phase bidirectional power factor corrector in which a first switch and a fourth switch form a first leg, a second switch and a fifth switch form a second leg, a third switch and a sixth switch form a third leg, the single-phase AC charging line is connected to the first leg, a second line is connected to the second leg, and a third line is connected to the third leg.

According to an embodiment of the present disclosure, the controller may control the switches of the first leg and the switches of the third leg to operate in a single-phase charging mode or a vehicle to grid (V2G) mode, and may control the switches of the second leg to supply power to the electronic device connected to the indoor power outlet while operating in the single-phase charging mode or the V2G mode when the indoor power outlet receives power through the second line.

According to an embodiment of the present disclosure, the controller may control the switches of the second leg while being synchronized with a phase of a voltage applied through the single-phase AC charging line.

According to an embodiment of the present disclosure, the apparatus may further include an outdoor power outlet that receives power through the single-phase AC charging line, and a sensor that measures required power of an electronic device connected to the outdoor power outlet, wherein the controller may control the switches of the first leg and the switches of the third leg to supply power to the electronic device connected to the outdoor power outlet, and may control the switches of the second leg to supply power to the electronic device connected to the indoor power outlet when the indoor power outlet receives power through the second line.

According to an embodiment of the present disclosure, the bidirectional OBC may include a three-phase bidirectional power factor corrector in which a first switch and a fourth switch form a first leg, a second switch and a fifth switch form a second leg, a third switch and a sixth switch form a third leg, a seventh switch and an eighth switch form a fourth leg, the single-phase AC charging line is connected to the first leg, a second line is connected to the second leg, a third line is connected to the third leg, and an N-phase line is connected to the fourth leg.

According to an embodiment of the present disclosure, the controller may control the switches of the first leg and the switches of the fourth leg to operate in a single-phase charging mode or a vehicle to grid (V2G) mode, and may control the switches of the second leg to supply power to the electronic device connected to the indoor power outlet while operating in the single-phase charging mode or the V2G mode when the indoor power outlet receives power through the second line.

According to an embodiment of the present disclosure, the apparatus may further include an outdoor power outlet that receives power through the single-phase AC charging line, and a sensor that measures required power of an electronic device connected to the outdoor power outlet, wherein the controller may control the switches of the first leg and the switches of the fourth leg to supply power to the electronic device connected to the outdoor power outlet, and may control the switches of the second leg to supply power to the electronic device connected to the indoor power outlet when the indoor power outlet receives power through the second line.

According to an embodiment of the present disclosure, the controller may control the switches of the first leg, the switches of the second leg, and the switches of the fourth leg to operate in a single-phase charging mode or a vehicle to grid (V2G) mode, and may control the switches of the third leg to supply power to the electronic device connected to the indoor power outlet while operating in the single-phase charging mode or the V2G mode when the indoor power outlet receives power through the third line.

According to an embodiment of the present disclosure, the apparatus may further include an outdoor power outlet that receives power through the single-phase AC charging line, and a sensor that measures required power of an electronic device connected to the outdoor power outlet, wherein the controller may control the switches of the first leg, the switches of the second leg, and the switches of the fourth leg to supply power to the electronic device connected to the outdoor power outlet, and may control the switches of the third leg to supply power to the electronic device connected to the indoor power outlet when the indoor power outlet receives power through the third line.

According to an embodiment of the present disclosure, the bidirectional OBC may include a first module in which a first single-phase bidirectional power factor corrector (PFC) and a first bidirectional DC/DC converter are connected in series, a second module in which a second single-phase bidirectional PFC and a second bidirectional DC/DC converter are connected in series, and a third module in which a third single-phase bidirectional PFC and a third bidirectional DC/DC converter are connected in series, wherein the first module, the second module and the third module are connected in parallel, the single-phase AC charging line is connected to the first module, the second line is connected to the second module, and the third line is connected to the third module.

According to an embodiment of the present disclosure, the controller may control the first module to operate in a single-phase charging mode or a vehicle to grid (V2G) mode, and may control the second module to supply power to the electronic device connected to the indoor power outlet while operating in the single-phase charging mode or the V2G mode when the indoor power outlet receives power through the second line.

According to an embodiment of the present disclosure, the apparatus may further include an outdoor power outlet that receives power through the single-phase AC charging line, and a sensor that measures required power of an electronic device connected to the outdoor power outlet, wherein the controller may control the first module to supply power to the electronic device connected to the outdoor power outlet, and may control the second module to supply power to the electronic device connected to the indoor power outlet when the indoor power outlet receives power through the second line.

According to an embodiment of the present disclosure, the controller may control the first module and the second module to operate in a single-phase charging mode or a vehicle to grid (V2G) mode, and may control the third module to supply power to the electronic device connected to the indoor power outlet while operating in the single-phase charging mode or the V2G mode when the indoor power outlet receives power through the third line.

According to an embodiment of the present disclosure, the apparatus may further include an outdoor power outlet that receives power through the single-phase AC charging line, and a sensor that measures required power of an electronic device connected to the outdoor power outlet, wherein the controller may control the first module and the second module to supply power to the electronic device connected to the outdoor power outlet, and may control the third module to supply power to the electronic device connected to the indoor power outlet when the indoor power outlet receives power through the third line.

According to another aspect of the present disclosure, a method of controlling a bidirectional on board charger (OBC) of an electric vehicle includes connecting an indoor power outlet to a line except for a first single-phase AC charging line among three-phase alternating current (AC) input lines, measuring, by a sensor, a required current of an electronic device connected to the indoor power outlet, and controlling, by a controller, the bidirectional OBC based on the required current.

According to an embodiment of the present disclosure, the controlling of the bidirectional OBC may include controlling the switches of the first leg and the switches of the third leg to operate in a single-phase charging mode or a vehicle to grid (V2G) mode when the indoor power outlet receives power through the second line, and controlling the switches of the second leg to supply power to the electronic device connected to the indoor power outlet while operating in the single-phase charging mode or the V2G mode.

BRIEF DESCRIPTION OF THE DRAWINGS

The above and other objects, features and advantages of embodiments of the present disclosure will be more apparent from the following detailed description taken in conjunction with the accompanying drawings, in which.

DETAILED DESCRIPTION OF ILLUSTRATIVE EMBODIMENTS

Figure 1:
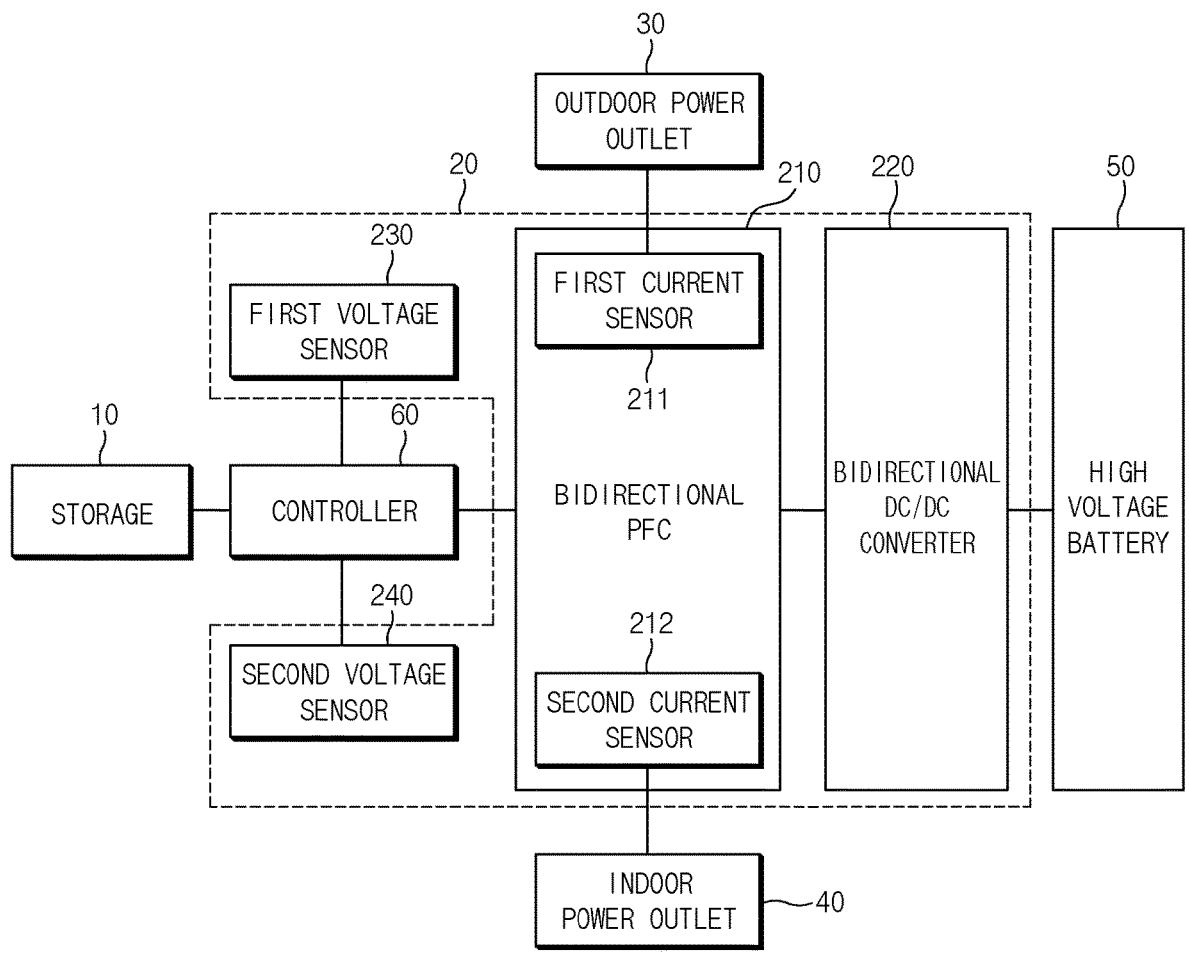
FIG. 1 is a block diagram illustrating the configuration of an apparatus for controlling a bidirectional OBC of an electric vehicle according to a first embodiment of the present disclosure.

Hereinafter, some embodiments of the present disclosure will be described in detail with reference to the exemplary drawings. In adding the reference numerals to the components of each drawing, it should be noted that the identical or equivalent component is designated by the identical numeral even when it is displayed on other drawings. Further, in describing the embodiments of the present disclosure, a detailed description of the related known configuration or function will be omitted when it is determined that it interferes with the understanding of the embodiments of the present disclosure.

In describing the components of the embodiments according to the present disclosure, terms such as first, second, A, B, (a), (b), and the like may be used. These terms are merely intended to distinguish the components from other components, and the terms do not limit the nature, order or sequence of the components. Unless otherwise defined, all terms including technical and scientific terms used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

FIG. 1 is a block diagram illustrating the configuration of an apparatus for controlling a bidirectional OBC of an electric vehicle according to a first embodiment of the present disclosure.

As shown in FIG. 1, an apparatus for controlling a bidirectional OBC of an electric vehicle according to the first embodiment of the present disclosure may include a storage 10, a bidirectional OBC 20, an outdoor power outlet 30, an indoor power outlet 40, a high voltage battery 50, and a controller 60. In this case, according to a scheme of implementing an apparatus for controlling a bidirectional OBC of an electric vehicle according to the first embodiment of the present disclosure, components may be combined with each other to be implemented as one, and some components may be omitted.

Figure 2:
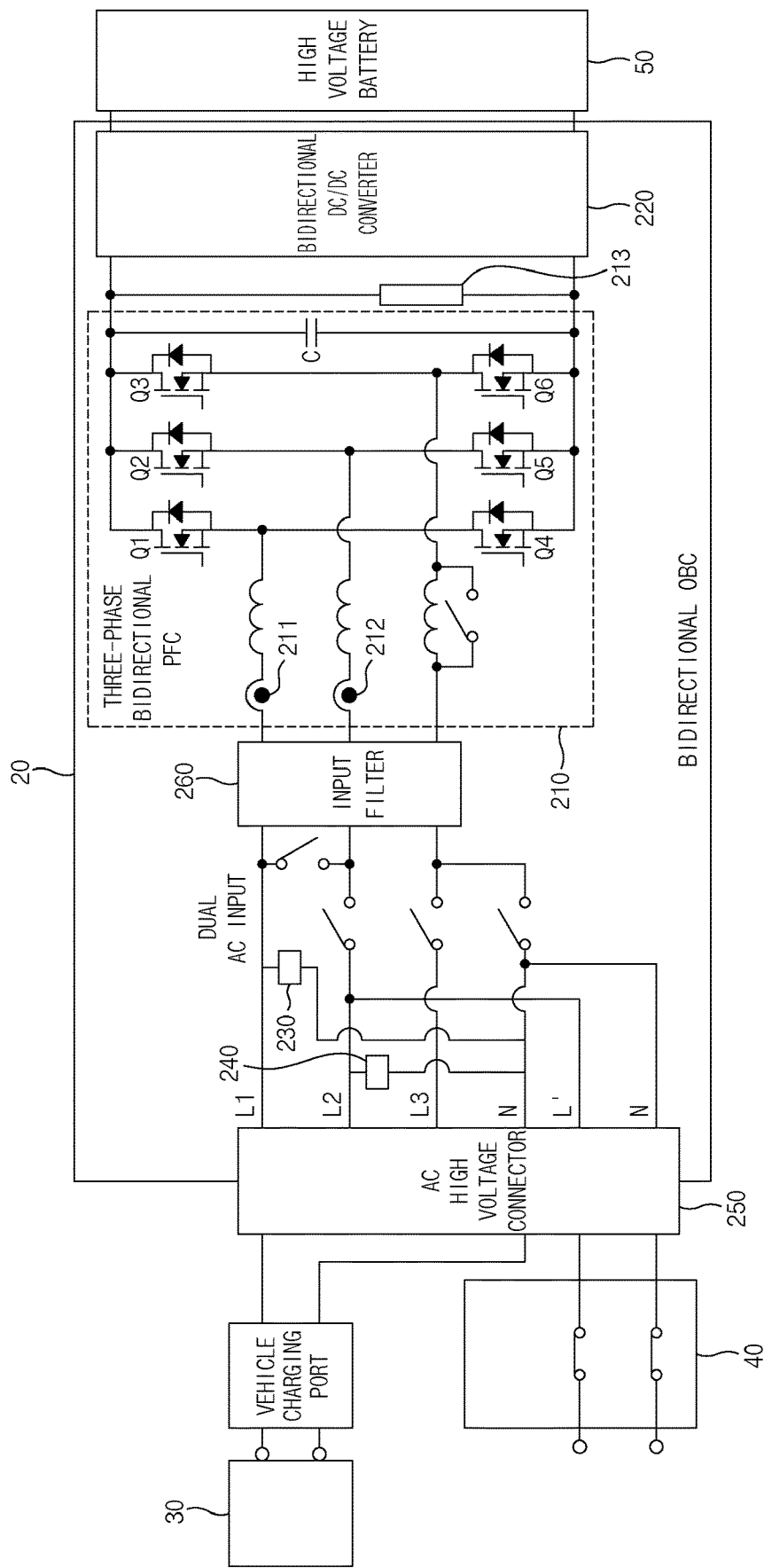
FIG. 2 is a circuit diagram of an apparatus for controlling a bidirectional OBC of an electric vehicle according to the first embodiment of the present disclosure.

FIG. 2 is a circuit diagram of an apparatus for controlling a bidirectional OBC of an electric vehicle according to the first embodiment of the present disclosure.

Hereinafter, the components of an apparatus for controlling a bidirectional OBC of an electric vehicle according to the first embodiment of the present disclosure will be described in detail with reference to FIGS. 1 and 2.

First, the storage 10 may store various logics, algorithms, and programs required in the processes of branching a line for supplying power from a line except a single-phase AC charging line among three-phase AC input lines to an indoor power outlet of an electric vehicle, measuring a required current of the electronic device connected to the indoor power outlet, and controlling the bidirectional OBC based on the required current.

The storage 10 may store a reference link voltage $V_{link,ref}$, a dq-converted reference voltage $V_{ac1,dq,ref}$ of the outdoor power outlet 30, a dq-converted reference voltage $V_{ac2,dq,ref}$ of the indoor power outlet 40, and a reference frequency $f_{ac1,ref}$ of an AC voltage supplied to the outdoor power outlet 30.

The storage 10 may include at least one type of a storage medium of memories of a flash memory type, a hard disk type, a micro type, a card type (e.g., a secure digital (SD) card or an extreme digital (XD) card), and the like, and a random access memory (RAM), a static RAM (SRAM), a read-only memory (ROM), a programmable ROM (PROM), an electrically erasable PROM (EEPROM), a magnetic memory (MRAM), a magnetic disk, and an optical disk type memory.

The bidirectional OBC 20 may convert alternating current to direct current to charge the high voltage battery 50 and convert direct current power of the high voltage battery 50 into alternating current power (the same voltage and frequency as commercial power) to supply power to a power grid (or bidirectional EVSE).

The bidirectional OBC 20 may include a three-phase bidirectional PFC 210, a bidirectional DC/DC converter 220, a first voltage sensor 230, a second voltage sensor 240, an AC high voltage connector 250, and an input filter 260. In this case, the three-phase bidirectional PFC 210, which is a module for increasing energy efficiency, may include a first current sensor 211 for measuring an inductor current of line L1, a second current sensor 212 for measuring an inductor current of line L2, and a third voltage sensor 213 for measuring a link voltage. In this case, the three-phase bidirectional PFC 210 may perform AC/DC power conversion, power factor correction, and minimization of reactive power. The bidirectional DC/DC converter 220 may stably supply power of the high voltage battery 50 to a power network, the outdoor power outlet 30 or the indoor power outlet 40, or may stably supply power supplied from electric vehicle service equipment (EVSE) to the high voltage battery 50. The first voltage sensor 230 may measure the voltage of the single-phase AC charging line L1 during single-phase charging. The second voltage sensor 240 may measure the voltage of the line L2 or the voltage of the line L3 among the three-phase AC input lines. The AC high voltage connector 250 may connect the vehicle charging port and the indoor power outlet 40 to the bidirectional OBC 20. The input filter 260 may remove noise from the AC power supplied from the EVSE. The N line refers to an N-phase (neutral conductor) line.

When the high voltage battery 50 is not being charged, the outdoor power outlet 30, which is a module detachable from an electric vehicle charging port, may be connected to an electronic device to transmit power.

The indoor power outlet 40 may be located in the interior of the electric vehicle, and may transmit power of the high voltage battery 50 to a connected electronic device. In this case, line L' for supplying power to the indoor power outlet 40 may be branched from line L2 or L3.

Meanwhile, the controller 60 may perform overall control such that each of the components normally performs its function. The controller 60 may be implemented in the form of hardware or software, or may be implemented in the form of a combination of hardware and software. Preferably, the controller 60 may be implemented with a microprocessor, but is not limited thereto.

In particular, the controller 60 may branch the line supplying power to the indoor power outlet of the electric vehicle from a line except for the single-phase AC charging line among the three-phase AC input lines, measure required current of an electronic device connected to the indoor power outlet, and perform various controls in the process of controlling the bidirectional OBC based on the required current.

Hereinafter, the operation of the controller 60 will be described in detail with reference to FIGS. 3A to 4B.

Figure 3A:
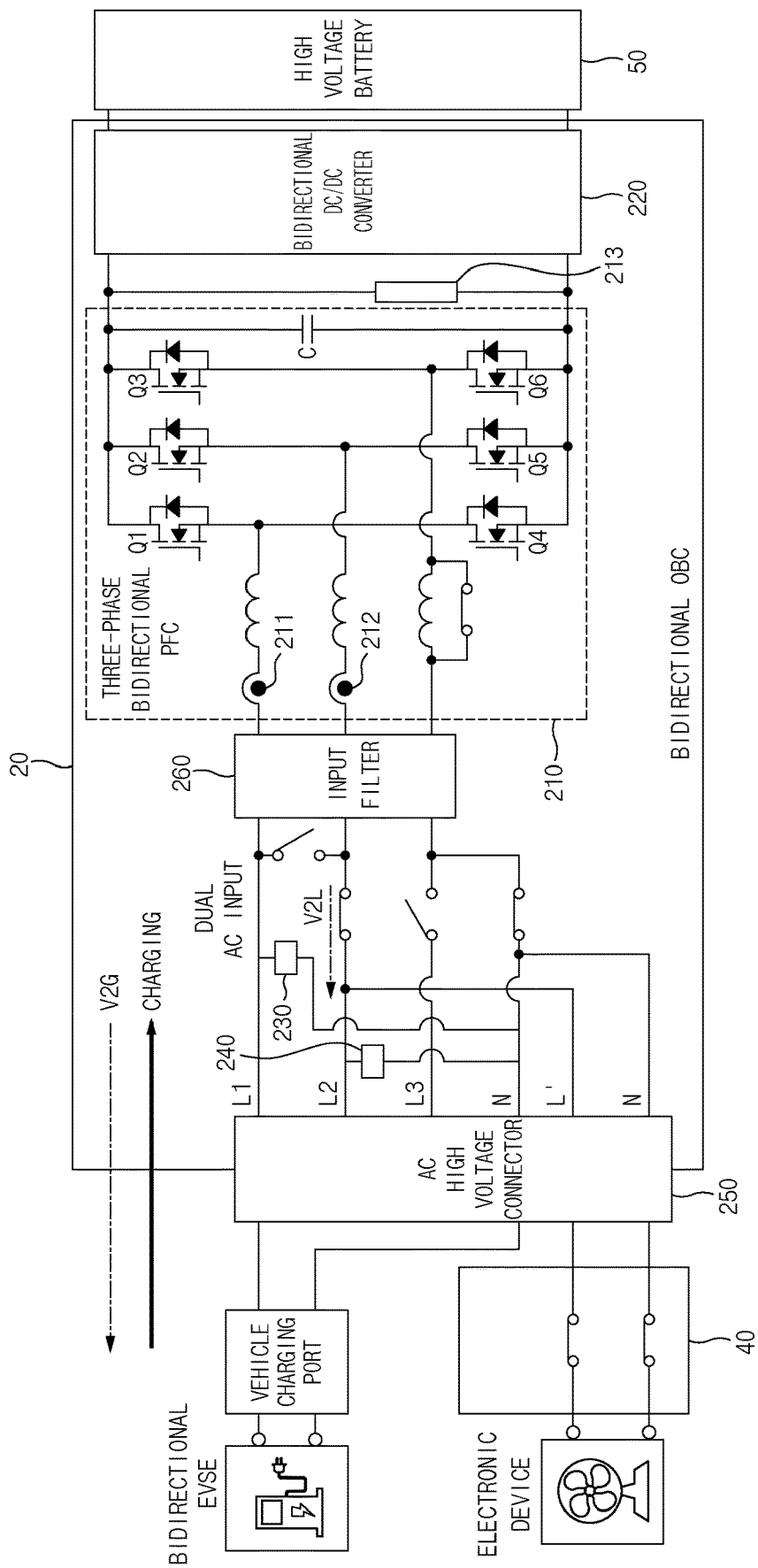
FIG. 3A is an exemplary circuit diagram illustrating the operation of an apparatus for controlling a bidirectional on board charger (OBC) of an electric vehicle according to the first embodiment of the present disclosure.
Figure 3B:
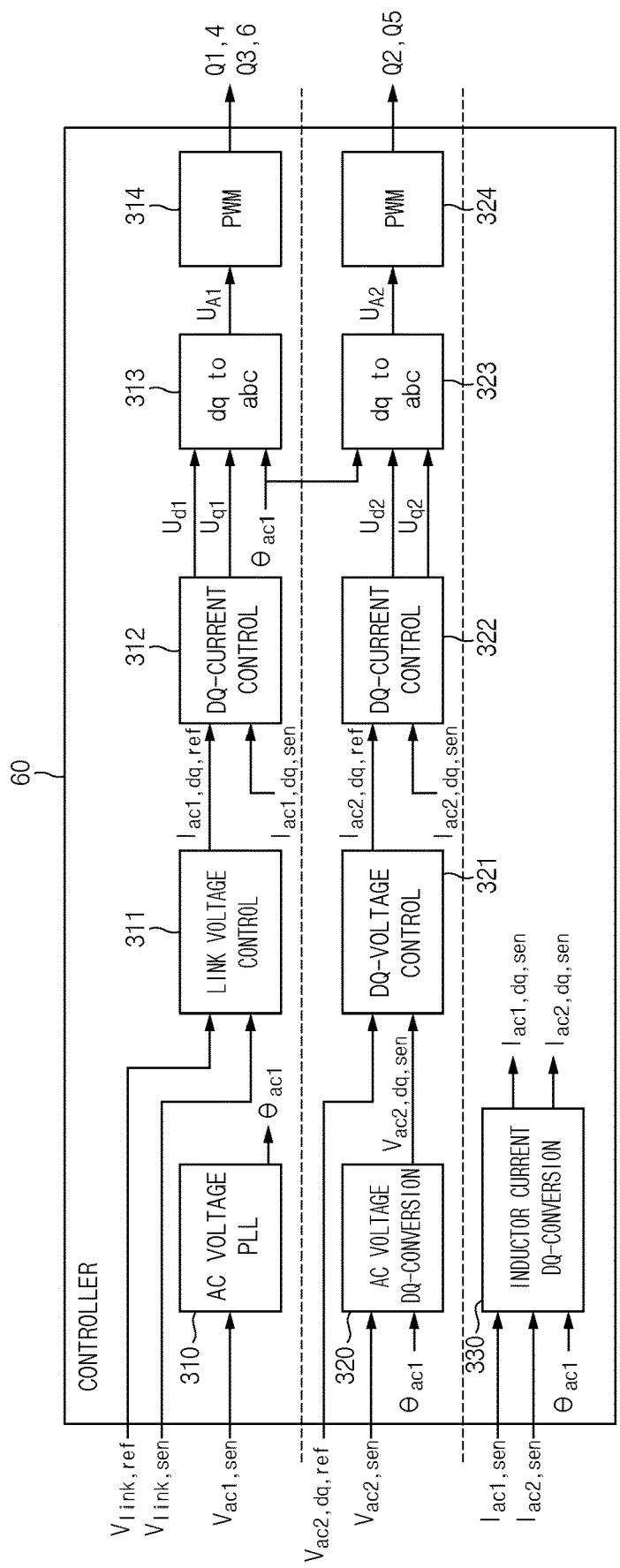
FIG. 3B is an exemplary circuit diagram illustrating the operation of a controller provided in the apparatus for controlling a bidirectional on board charger (OBC) of an electric vehicle according to the first embodiment of the present disclosure.

FIG. 3A is an exemplary circuit diagram illustrating the operation of an apparatus for controlling a bidirectional on board charger (OBC) of an electric vehicle according to the first embodiment of the present disclosure. FIG. 3B is an exemplary circuit diagram illustrating the operation of a controller provided in the apparatus for controlling an OBC of an electric vehicle according to the first embodiment of the present disclosure.

As shown in FIG. 3A, when operating in the single-phase charging mode, the power supplied from the EVSE passes through the input filter 260 through the line L1, and when operating in the V2G mode, the power supplied from the high voltage battery 50 passes through the input filter 260 through the line L1. In addition, while operating in the single-phase charging mode or the V2G mode, the power supplied to the electronic device connected to the indoor power outlet 40 passes through the input filter 260 through the line L2. In this case, the controller 60 may open a switch connecting the lines L1 and L2, and close the switch located on the line L2 between the AC high voltage connector 250 and the input filter 260.

As described above, in the single-phase charging mode or V2G mode, to supply power to an electronic device connected to the indoor power outlet 40, the controller 60 may perform an operation as shown in FIG. 3B.

The controller 60 may control specific switches Q1, Q3, Q4, and Q6 of the three-phase bidirectional PFC 210 to operate in the single-phase charging mode or the V2G mode, and may control specific switches Q2 and Q5 of the three-phase bidirectional PFC 210 in synchronization with the control (AC frequency) to supply power to the electronic device connected to the indoor power outlet 40. In this case, the switches Q3 and Q6 may be commonly used in the process of operating in a single-phase charging mode or the V2G mode and in the process of supplying power to the electronic device connected to the indoor power outlet 40.

In order to operate in a single-phase charging mode or the V2G mode, first, the controller 60 may extract a phase $\theta_{ac1}$ of the voltage $V_{ac1,sen}$ of the line L1 measured by the first voltage sensor 230 based on a phase-locked loop (PLL) (310).

Then, the controller 60 may determine a reference current $I_{ac1.dq.ref}$ that allows the link voltage $V_{link,sen}$ measured by the third voltage sensor 213 to follow the reference link voltage $V_{link,ref}$ stored in the storage 10 (311). In this case, the reference current $I_{ac1.dq.ref}$ is a dq-converted reference current.

Thereafter, the controller 60 dq-converts the inductor current $I_{ac1,sen}$ measured by the first current sensor 211 in synchronization with the phase $\theta_{ac1}$, and dq-converts the inductor current $I_{ac2,sen}$ measured by the second current sensor 212 (330). In this case, the result of the dq conversion of the inductor current $I_{ac1,sen}$ is called a first current $I_{ac1,dq,sen}$, and the result of the dq conversion of the inductor current $I_{ac2,sen}$ is called a second current $I_{ac2.dq.sen}$.

Thereafter, the controller 60 determines a d-axis current control signal $U_{d1}$ and a q-axis current control signal $U_{q1}$ that cause the first current $I_{ac1.dq.sen}$ to follow the reference current $I_{ac1.dq.ref}$ (312).

Thereafter, the controller 60 inversely converts (dq to abc) the d-axis current control signal $U_{d1}$ and the q-axis current control signal $U_{q1}$ in synchronization with the phase $\theta_{ac1}$ (313).

Thereafter, the controller 60 outputs a PWM signal by performing pulse width modulation (PWM) on the control signal $U_{A1}$ (314), and controls the switches Q1, Q3, Q4, and Q6 of the three-phase bidirectional PFC 210 based on the PWM signal.

Meanwhile, in order to supply power to an electronic device connected to the indoor power outlet 40 during operation in the single-phase charging mode or the V2G mode, first, the controller 60 dg-converts the L2 voltage $V_{ac2,sen}$ measured by the second voltage sensor 240 in synchronization with the phase $\theta_{ac1}$ (320). In this case, the dq-converted L2 voltage $V_{ac2,sen}$ is referred to as a second voltage $V_{ac2,sen}$.

Then, the controller 60 determines the reference current $I_{ac2.dq.ref}$ that causes the second voltage $V_{ac2,dq,sen}$ to follow the dq-converted reference voltage $V_{ac2.dq.ref}$ of the indoor power outlet 40 stored in the storage 10 (321). In this case, the reference current $I_{ac2.dq.ref}$ is a dq-converted reference current.

Then, the controller 60 determines the d-axis current control signal $U_{d2}$ and the q-axis current control signal $U_{q2}$ that cause the second current $I_{ac2.dq.sen}$ to follow the reference current $I_{ac2.dq.ref}$ (322).

Thereafter, the controller 60 inversely converts (dq to abc) the d-axis current control signal $U_{d2}$ and the q-axis current control signal $U_{q2}$ to output a control signal $U_{A2}$ in synchronization with the phase $\theta_{ac1}$ (323).

Thereafter, the controller 60 outputs a PWM signal by performing pulse width modulation (PWM) on the control signal $U_{A2}$ (324), and controls the switches Q2 and Q5 of the three-phase bidirectional PFC 210 based on the PWM signal.

Figure 4A:
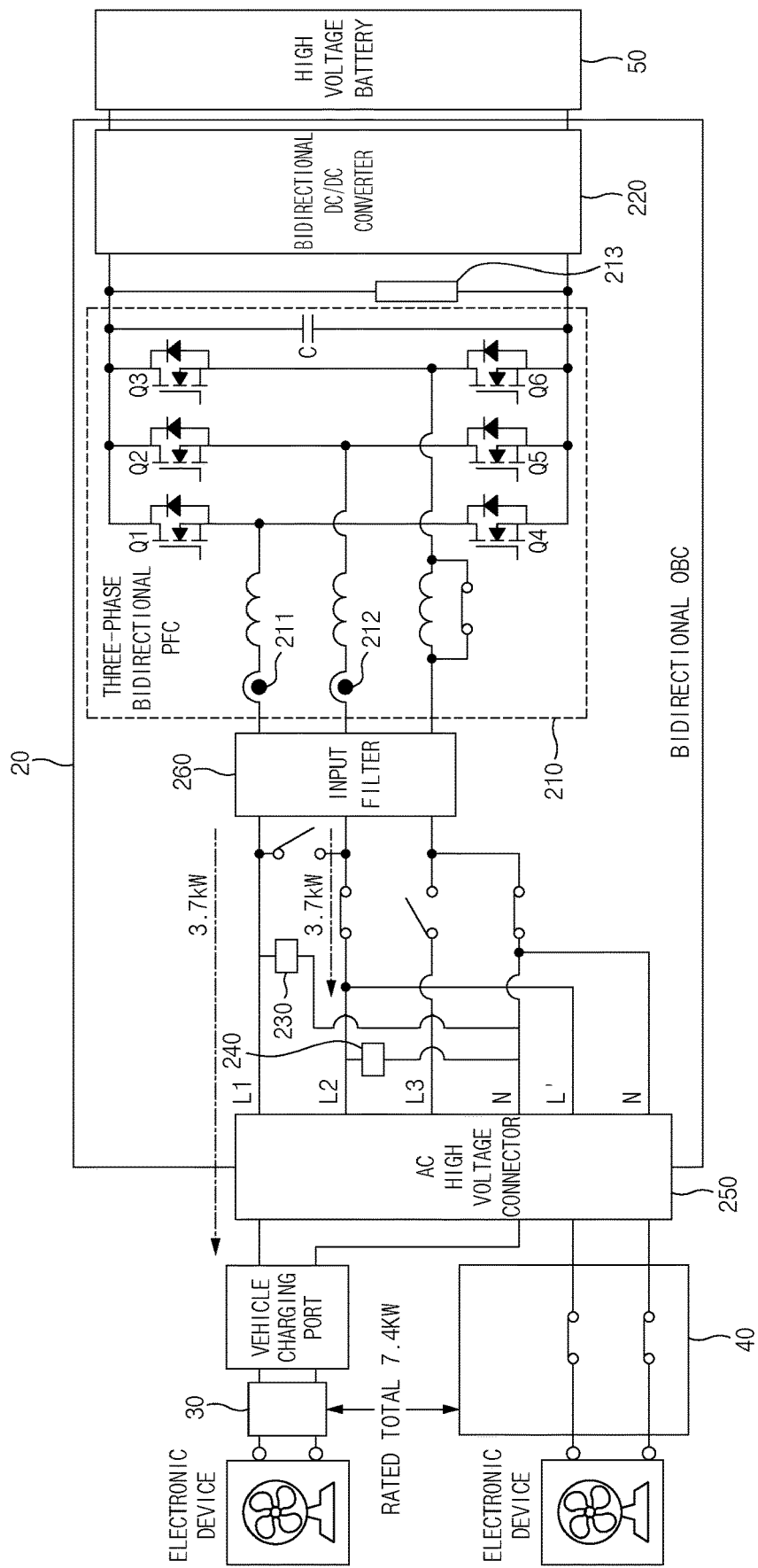
FIG. 4A is another exemplary circuit diagram illustrating the operation of an apparatus for controlling a bidirectional OBC of an electric vehicle according to the first embodiment of the present disclosure.
Figure 4B:
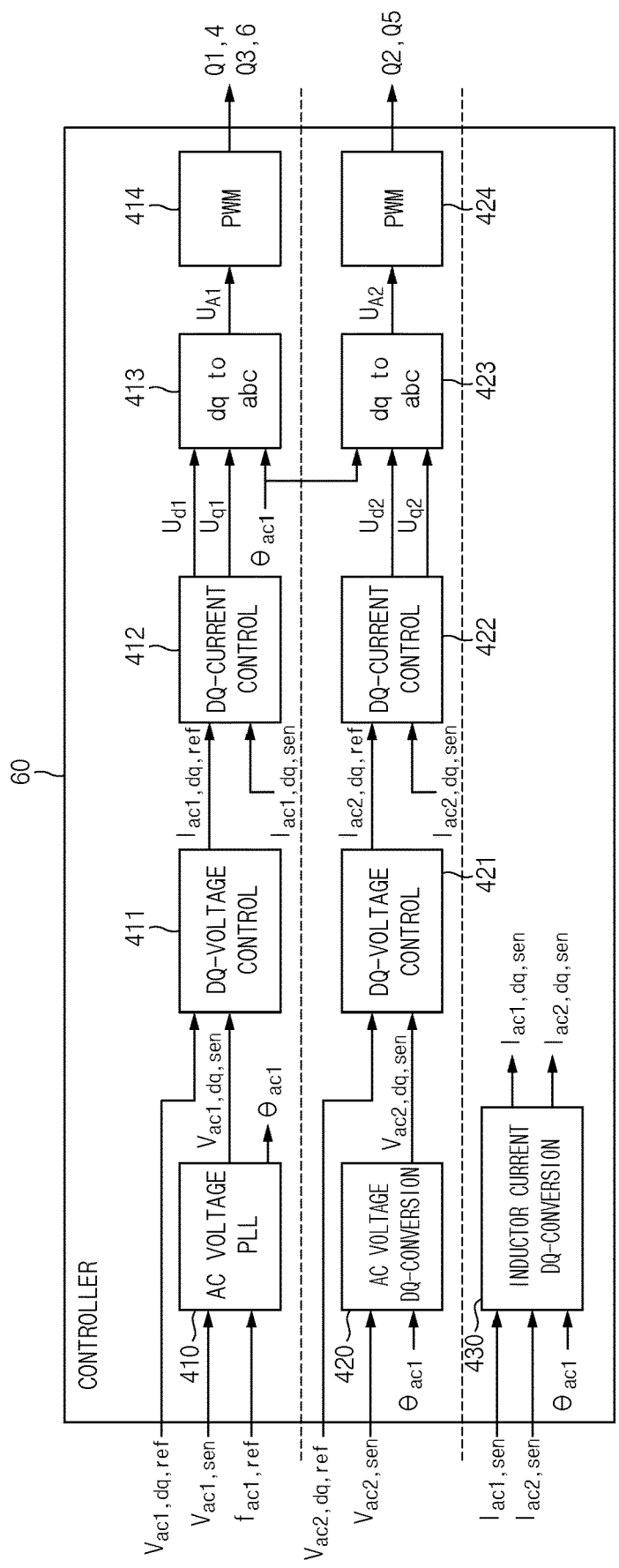
FIG. 4B is another exemplary circuit diagram illustrating the operation of a controller provided in the apparatus for controlling a bidirectional OBC of an electric vehicle according to the first embodiment of the present disclosure.

FIG. 4A is another exemplary circuit diagram illustrating the operation of an apparatus for controlling a bidirectional OBC of an electric vehicle according to the first embodiment of the present disclosure. FIG. 4B is another exemplary circuit diagram illustrating the operation of a controller provided in the apparatus for controlling a bidirectional OBC of an electric vehicle according to the first embodiment of the present disclosure.

As shown in FIG. 4A, when not operating in the single-phase charging mode or the V2G mode, the power supplied to the electronic device connected to the outdoor power outlet 30 passes through the input filter 260 through the line L1, and the power supplied to the electronic device connected to the indoor power outlet 40 passes through the input filter 260 through the line L2. In this case, the controller 60 may open the switch connecting the lines L1 and L2, and close the switch located on the line L2 between the AC high voltage connector 250 and the input filter 260.

As described above, in order to supply power to the electronic device connected to the outdoor power outlet 30 and the electronic device connected to the indoor power outlet 40, the controller 60 may perform an operation as shown in FIG. 4B.

The controller 60 may control the specific switches Q1, Q3, Q4, and Q6 of the three-phase bidirectional PFC 210 to supply power to the electronic device connected to the outdoor power outlet 30, and may control the specific switches Q2 and Q5 of the three-phase bidirectional PFC 210 to supply power to the electronic device connected to the indoor power outlet 40 in synchronization with the control (AC frequency). In this case, the switches Q3 and Q6 may be commonly used in a process of supplying power to the electronic device connected to the outdoor power outlet 30 and a process of supplying power to the electronic device connected to the indoor power outlet 40.

In order to supply power to the electronic device connected to the outdoor power outlet 30, first, the controller 60 extracts the phase $\theta_{ac1}$ from the frequency $f_{ac1,ref}$ of the AC voltage supplied to the outdoor power outlet 30 and the L1 voltage $V_{ac1,sen}$ measured by the first voltage sensor 230 based on a phase-locked loop (PLL), and dq-converts the L1 voltage $V_{ac1,sen}$ measured by the first voltage sensor 230 to output the first voltage $V_{ac1,dq,sen}$ (410).

Thereafter, the controller 60 determines a reference current $I_{ac1.dq.red}$ that allows the first voltage $V_{ac1,dq,sen}$ to follow the reference voltage $V_{ac1,dq,ref}$. In this case, the reference current $I_{ac1.dq.ref}$ is a dq-converted reference current.

Thereafter, the controller 60 dq-converts the inductor current $I_{ac1,sen}$ measured by the first current sensor 211 in synchronization with the phase $\theta_{ac1}$, and dq-converts the inductor current $I_{ac2,sen}$ measured by the second current sensor 212 (430). In this case, the result of dq-converting the inductor current $I_{ac1.dq.sen}$ is called the first current $I_{ac1.dq.sen}$ and the result of dq-converting the inductor current $I_{ac2,sen}$ is called the second current $I_{ac2.dq.sen}$.

Then, the controller 60 determines a d-axis current control signal $U_{d1}$ and a q-axis current control signal $U_{q1}$ that allow the first current $I_{ac1.dq.sen}$ to follow the reference current $I_{ac1.dq.ref}$ (412).

Thereafter, the controller 60 inversely converts the d-axis current control signal $U_{d1}$ and the q-axis current control signal $U_{q1}$ to output a control signal $U_{A1}$ in synchronization with the phase $\theta_{ac1}$ (413).

Thereafter, the controller 60 outputs a PWM signal by performing PWM on the control signal $U_{A1}$ (414), and controls the switches Q1, Q3, Q4 and Q6 of the three-phase bidirectional PFC 210 based on the PWM signal. In this case, the controller 60 may supply power of up to 3.7 kW to an electronic device connected to the outdoor power outlet 30.

Meanwhile, in order to supply power to an electronic device connected to the indoor power outlet 40 during operation in the single-phase charging mode or the V2G mode, first, the controller 60 dg-converts the L2 voltage $V_{ac2,sen}$ measured by the second voltage sensor 240 in synchronization with the phase $\theta_{ac1}$ (420). In this case, the dq-converted L2 voltage $V_{ac2,sen}$ is referred to as a second voltage $V_{ac2,dq,sen}$.

Then, the controller 60 determines the reference current $I_{ac2.dq.ref}$ that causes the second voltage $V_{ac2,dq,sen}$ to follow the dq-converted reference voltage $V_{ac2,dq,ref}$ of the indoor power outlet 40 stored in the storage 10 (421). In this case, the reference current $I_{ac2.dq.ref}$ is a dq-converted reference current.

Then, the controller 60 determines the d-axis current control signal $U_{d2}$ and the q-axis current control signal $U_{q2}$ that cause the second current $I_{ac2.dq.sen}$ to follow the reference current $I_{ac2.dq.ref}$ (422).

Thereafter, the controller 60 inversely converts (dq to abc) the d-axis current control signal $U_{d2}$ and the q-axis current control signal $U_{q2}$ to output a control signal $U_{A2}$ while synchronizing with the phase $\theta_{ac1}$ (423).

Thereafter, the controller 60 outputs a PWM signal by performing pulse width modulation (PWM) on the control signal $U_{A2}$ (424), and controls the switches Q2 and Q5 of the three-phase bidirectional PFC 210 based on the PWM signal. In this case, the controller 60 may supply power of up to 3.7 kW to the electronic device connected to the indoor power outlet 40.

Figure 5A:
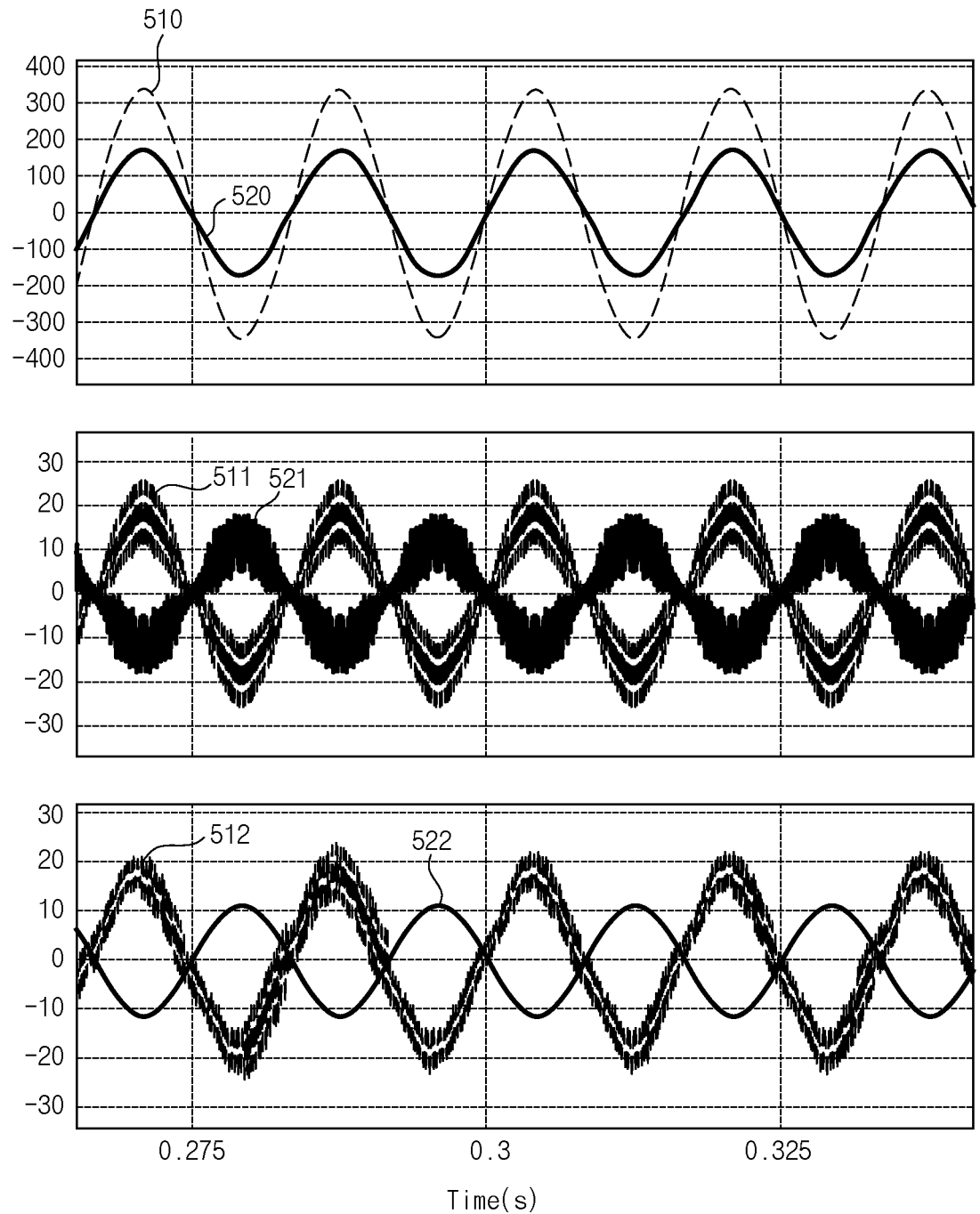
FIG. 5A is an exemplary graph illustrating the performance of an apparatus for controlling a bidirectional OBC of an electric vehicle according to the first embodiment of the present disclosure.

FIG. 5A is an exemplary graph illustrating the performance of an apparatus for controlling a bidirectional OBC of an electric vehicle according to the first embodiment of the present disclosure, which illustrates a state of supplying power to an electronic device connected to the indoor power outlet 40 while operating in a single-phase charging mode.

In FIG. 5A, reference numeral 510 represents a system voltage (e.g., 240 V), reference numeral 520 represents a commercial voltage (e.g., 120 V) supplied to an electronic device connected to the indoor power outlet 40, reference numeral 511 represents an inductor current on the line L1 to which the system voltage 510 is applied, reference numeral 521 represents an inductor current on the line L2 to which the commercial voltage 520 is applied, reference numeral 512 represents a system current, and reference numeral 522 represents a commercial current.

As shown in FIG. 5A, it may be understood that power is stably supplied to the electronic device connected to the indoor power outlet 40 even while operating in the single-phase charging mode.

Figure 5B:
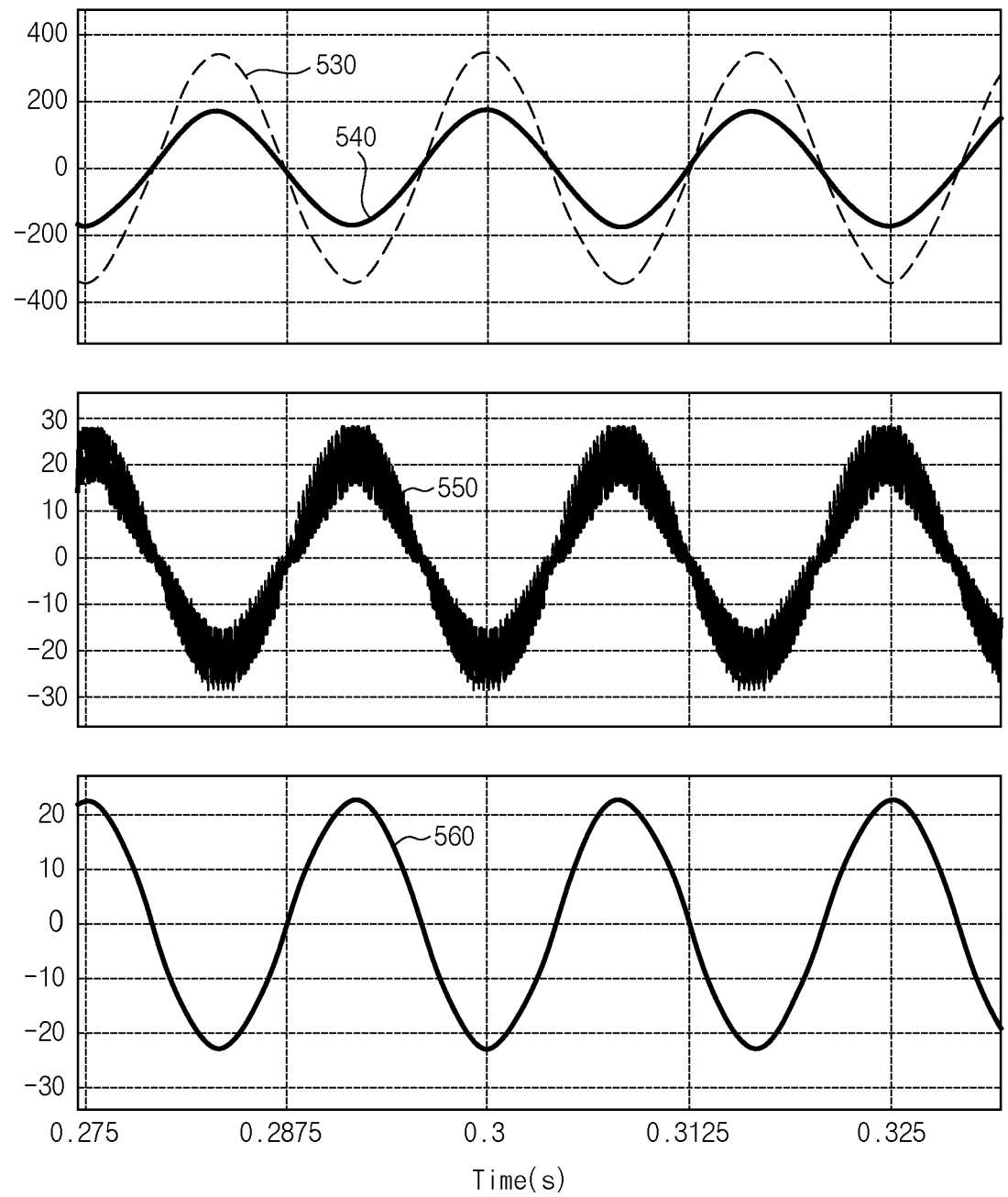
FIG. 5B is another exemplary graph illustrating the performance of an apparatus for controlling a bidirectional OBC of an electric vehicle according to the first embodiment of the present disclosure.

FIG. 5B is another exemplary graph illustrating the performance of an apparatus for controlling a bidirectional OBC of an electric vehicle according to the first embodiment of the present disclosure, which illustrates a state of supplying power to an electronic device connected to the outdoor power outlet 30 and an electronic device connected to the indoor power outlet 40.

In FIG. 5B, reference numeral 530 represents a voltage (e.g., 240V) supplied to an electronic device connected to the outdoor power outlet 30, and reference numeral 540 represents a voltage supplied to an electronic device connected to the indoor power outlet 40 (e.g., 120V). In addition, reference numeral 550 represents an inductor current on the line L1 to which the voltage 530 supplied to the electronic device connected to the outdoor power outlet 30 is applied, and the voltage 540 supplied to the electronic device connected to the indoor power outlet 40 is applied. In addition, reference numeral 560 represents a current supplied to the electronic device connected to the outdoor power outlet 30 and a current supplied to the electronic device connected to the indoor power outlet 40.

Figure 6:
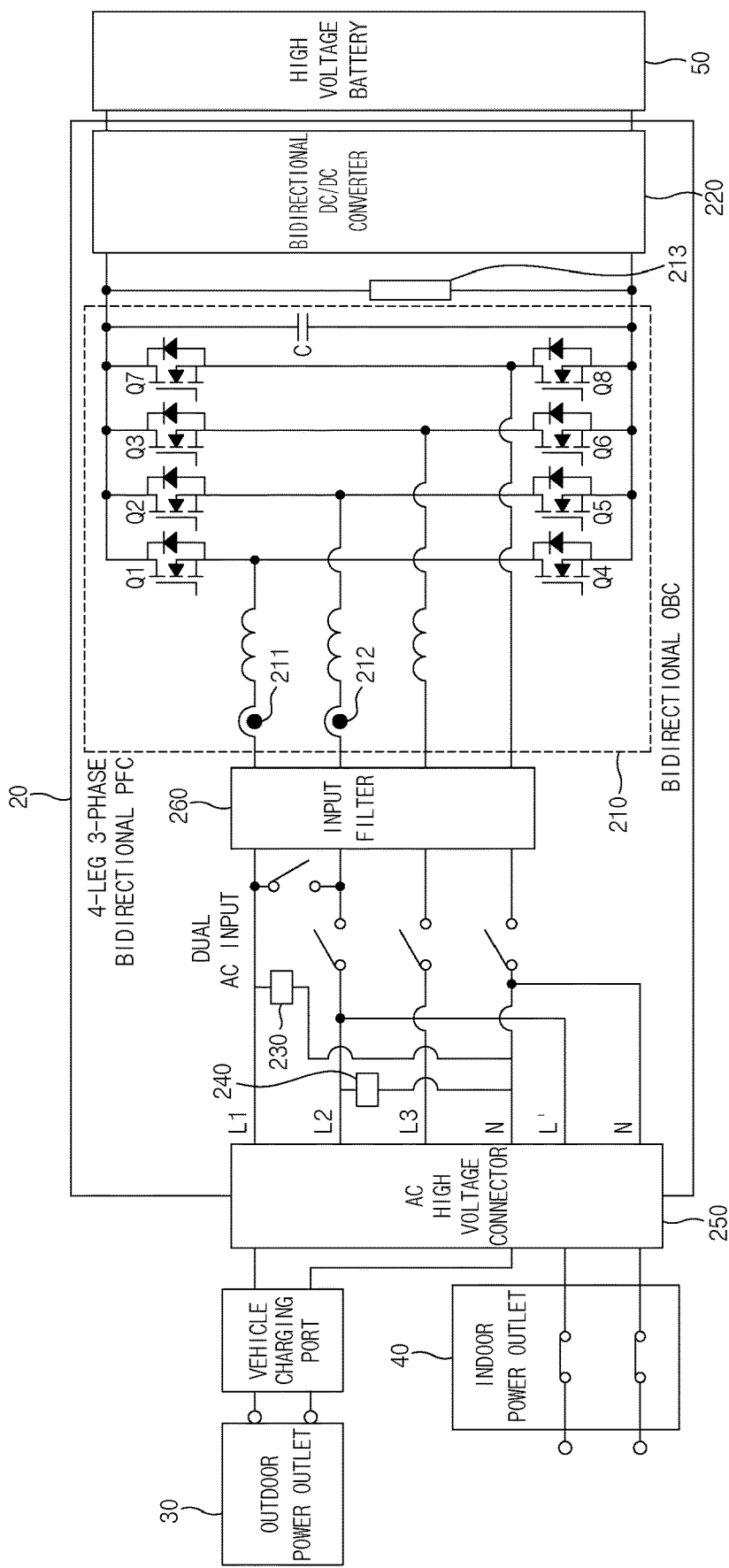
FIG. 6 is a circuit diagram illustrating an apparatus for controlling a bidirectional OBC of an electric vehicle according to a second embodiment of the present disclosure.

FIG. 6 is a circuit diagram illustrating an apparatus for controlling a bidirectional OBC of an electric vehicle according to a second embodiment of the present disclosure.

As shown in FIG. 6, the basic configuration is the same as that of the first embodiment, but the internal configuration of the three-phase bidirectional PFC 210 is different. That is, in the first embodiment, six switches Q1, Q2, Q3, Q4, Q5, and Q6 have a structure in which 3 legs (Q1 and Q4 form one leg, Q2 and Q5 form another leg, and Q3 and Q6 form the other leg) are formed, but in the second embodiment, eight switches Q1, Q2, Q3, Q4, Q5, Q6, Q7, and Q8 have a structure in which 4 legs (Q1 and Q4 are one leg, Q2 and Q5 form another leg, Q3 and Q6 form another leg, and Q7 and Q8 form the other leg) are formed.

In this case, the controller 60 may control the specific switches Q1, Q4, Q7, and Q8 of the three-phase bidirectional PFC 210 to operate in the single-phase charging mode or the V2G mode, and may control the specific switches Q2, Q5, Q7, and Q8 of the three-phase bidirectional PFC 210 in synchronization with the control (AC frequency) to supply power to the electronic device connected to the indoor power outlet 40. In this case, the switches Q7 and Q8 may be commonly used in the process of operating in the single-phase charging mode or the V2G mode, and in the process of supplying power to the electronic device connected to the indoor power outlet 40.

The controller 60 may control the specific switches Q1, Q4, Q7, and Q8 of the three-phase bidirectional PFC 210 to supply power to the electronic device connected to the outdoor power outlet 30, and may control the specific switches Q2, Q5, Q7, and Q8 of the three-phase bidirectional PFC 210 to supply power to the electronic device connected to the indoor power outlet 40 in synchronization with the control (AC frequency). In this case, the switches Q7 and Q8 may be commonly used in a process of supplying power to the electronic device connected to the outdoor power outlet 30 and a process of supplying power to the electronic device connected to the indoor power outlet 40.

Figure 7:
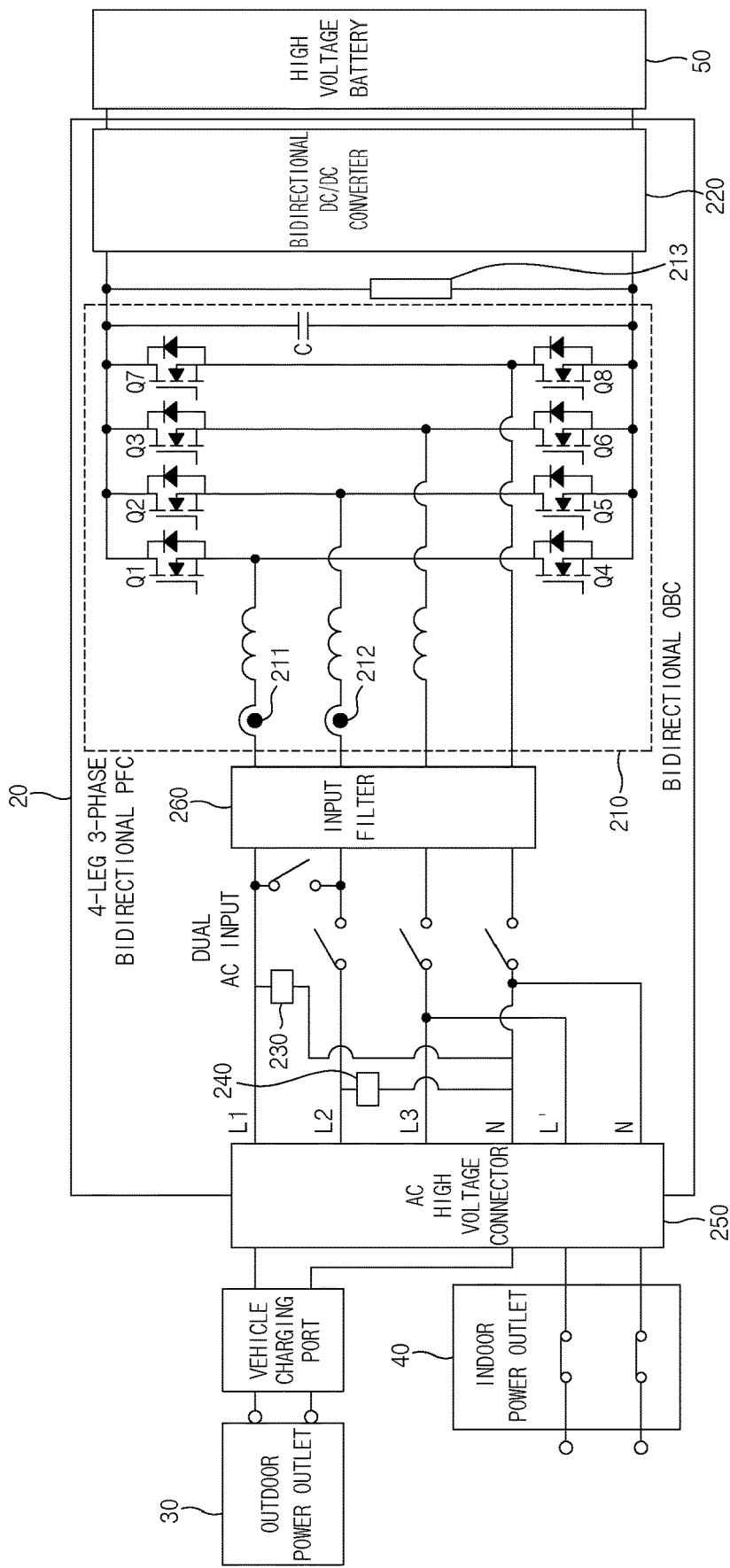
FIG. 7 is a circuit diagram illustrating the configuration of an apparatus for controlling a bidirectional OBC of an electric vehicle according to a third embodiment of the present disclosure.

FIG. 7 is a circuit diagram illustrating the configuration of an apparatus for controlling a bidirectional OBC of an electric vehicle according to a third embodiment of the present disclosure.

As shown in FIG. 7, the basic configuration is the same as that of the second embodiment, but the line L' for supplying power to the indoor power outlet 40 is branched from the line L3.

In this case, the controller 60 may control the specific switches Q1, Q2, Q4, Q5, Q7, and Q8 of the three-phase bidirectional PFC 210 to operate in a single-phase charging mode or the V2G mode, and in synchronization with the control (AC frequency), may control the specific switches Q3, Q6, Q7, and Q8 of the three-phase bidirectional PFC 210 to supply power to the electronic device connected to the indoor power outlet 40. In this case, the switches Q7 and Q8 may be commonly used in the process of operating in the single-phase charging mode or the V2G mode and in the process of supplying power to the electronic device connected to the indoor power outlet 40.

The controller 60 may control the specific switches Q1, Q2, Q4, Q5, Q7, and Q8 of the three-phase bidirectional PFC 210 to supply power to the electronic device connected to the outdoor power outlet 30, and may control the specific switches Q3, Q6, Q7, and Q8 of the three-phase bidirectional PFC 210 to supply power to the electronic device connected to the indoor power outlet 40 in synchronization with the control (AC frequency). In this case, the switches Q7 and Q8 may be commonly used in a process of supplying power to the electronic device connected to the outdoor power outlet 30 and a process of supplying power to the electronic device connected to the indoor power outlet 40.

Figure 8:
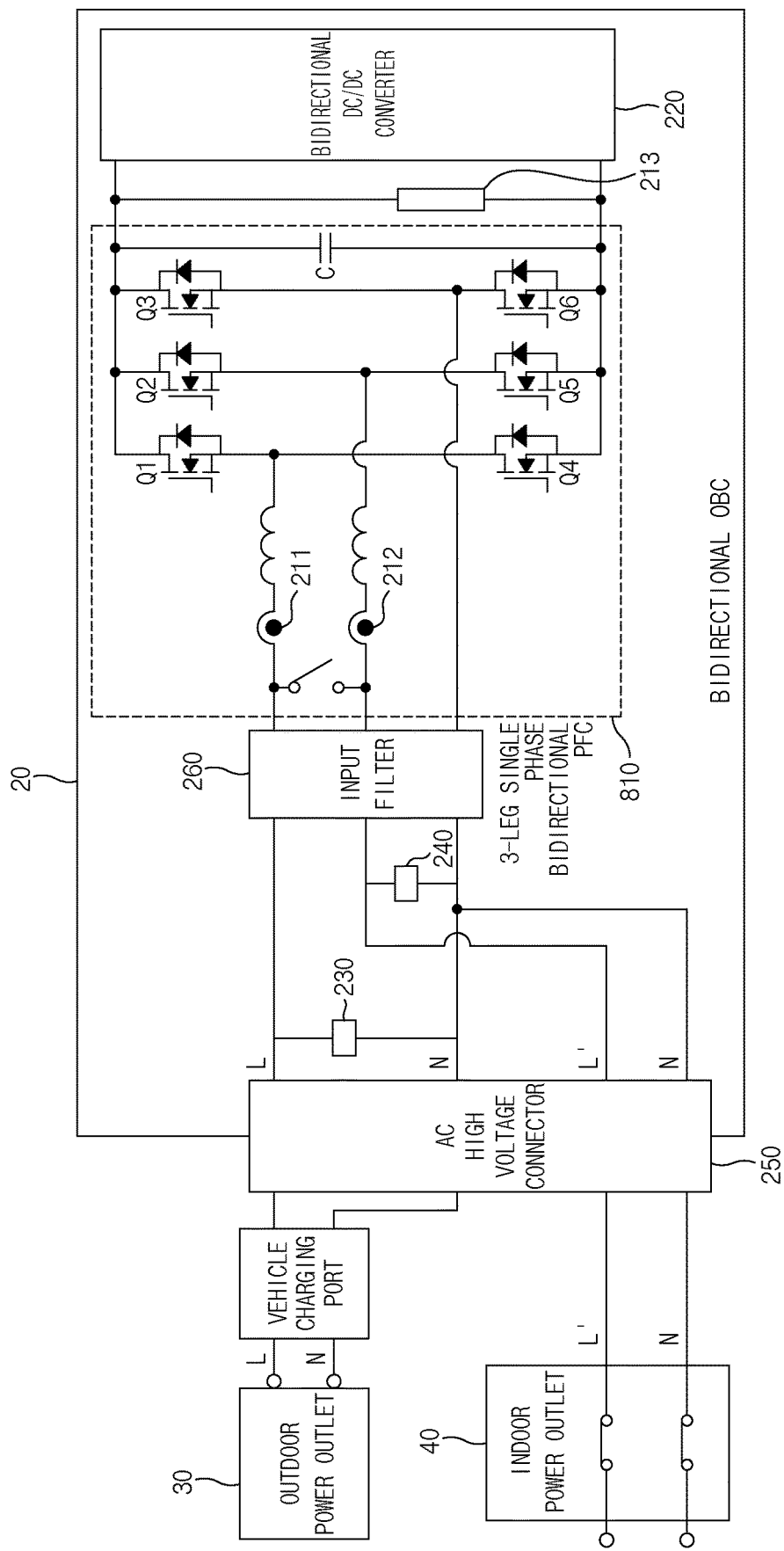
FIG. 8 is a circuit diagram illustrating the configuration of an apparatus for controlling a bidirectional OBC of an electric vehicle according to a fourth embodiment of the present disclosure.

FIG. 8 is a circuit diagram illustrating the configuration of an apparatus for controlling a bidirectional OBC of an electric vehicle according to a fourth embodiment of the present disclosure.

As shown in FIG. 8, an apparatus for controlling a bidirectional OBC of an electric vehicle according to the fourth embodiment of the present disclosure includes a single-phase bidirectional PFC 810.

In this case, the controller 60 may control the specific switches Q1, Q3, Q4, and Q6 of the single-phase bidirectional PFC 810 to operate in a single-phase charging mode or the V2G mode, and may control the specific switches Q2, Q3, Q5, and Q6 of the single-phase bidirectional PFC 810 in synchronization with the control (AC frequency) to supply power to the electronic device connected to the indoor power outlet 40. In this case, the switches Q3 and Q6 may be commonly used in the process of operating in a single-phase charging mode or V2G mode and in the process of supplying power to the electronic device connected to the indoor power outlet 40.

The controller 60 may control the specific switches Q1, Q3, Q4, and Q6 of the single-phase bidirectional PFC 810 to supply power to the electronic device connected to the outdoor power outlet 30, and control the specific switches Q2, Q3, Q5, and Q6 of the single-phase bidirectional PFC 810 in synchronization with the control (AC frequency) to supply power to the electronic device connected to the indoor power outlet 40. In this case, the switches Q3 and Q6 may be commonly used in a process of supplying power to the electronic device connected to the outdoor power outlet 30 and a process of supplying power to the electronic device connected to the indoor power outlet 40.

Figure 9:
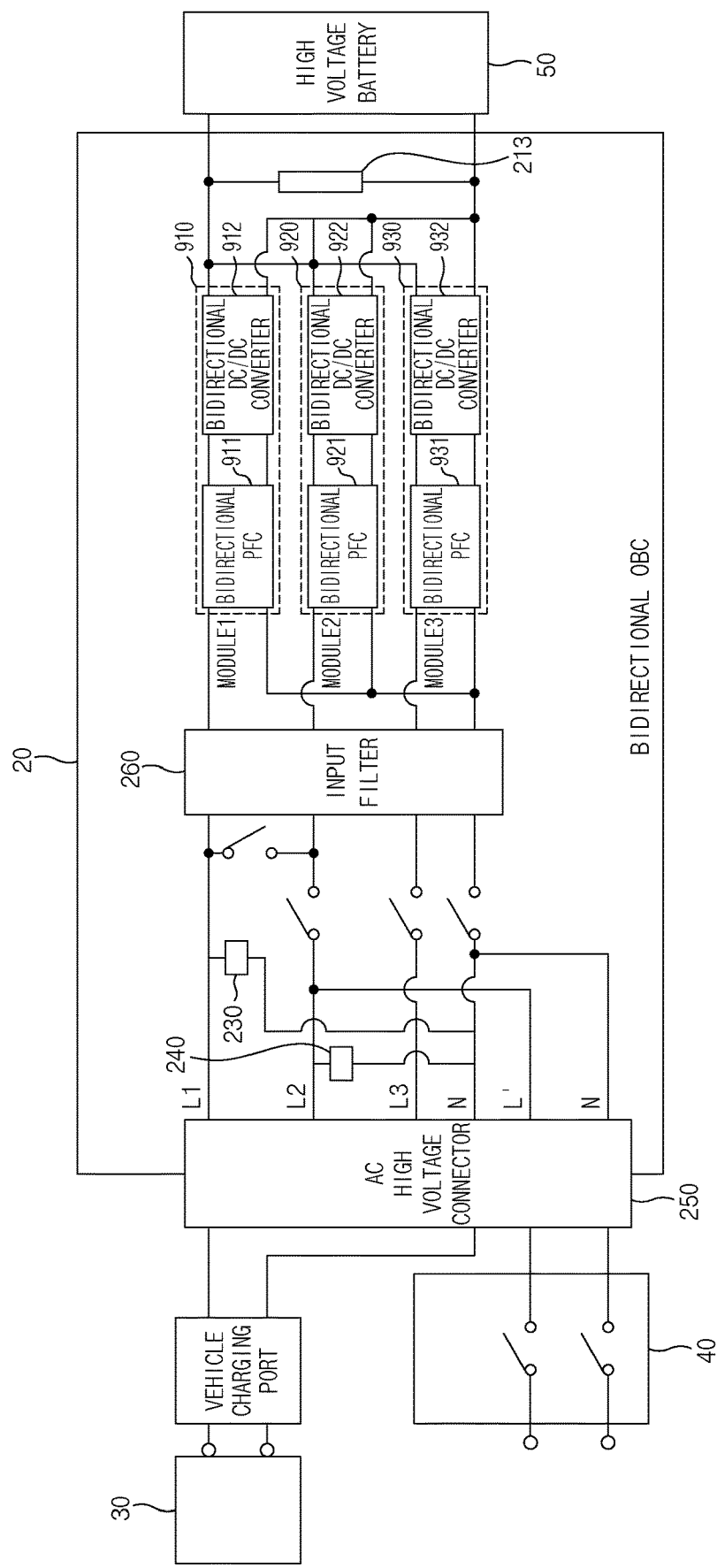
FIG. 9 is a circuit diagram illustrating the configuration of an apparatus for controlling a bidirectional OBC of an electric vehicle according to a fifth embodiment of the present disclosure.

FIG. 9 is a circuit diagram illustrating the configuration of an apparatus for controlling a bidirectional OBC of an electric vehicle according to a fifth embodiment of the present disclosure.

As shown in FIG. 9, an apparatus for controlling a bidirectional OBC of an electric vehicle according to a fifth embodiment of the present disclosure may include a first module 910, a second module 920, and a third module 930. In this case, a single-phase bidirectional PFC 911 and a bidirectional DC/DC converter 912 constitute the first module 910, and a single-phase bidirectional PFC 921 and a bi-directional DC/DC converter 922 constitute the second module 920. A single-phase bidirectional PFC 931 and a bidirectional DC/DC converter 932 constitute the third module 930.

In this case, the controller 60 may control the first module 910 to operate in the single-phase charging mode or the V2G mode, and may control the second module 920 to supply power to an electronic device connected to the indoor power outlet 40. For reference, the controller 60 may use all of the first to third modules 910 to 930 for the three-phase charging in the three-phase charging mode.

The controller 60 may control the first module 910 to supply power to the electronic device connected to the outdoor power outlet 30 during the stop, and control the second module 920 to supply power to the electronic device connected to the indoor power outlet 40.

Figure 10:
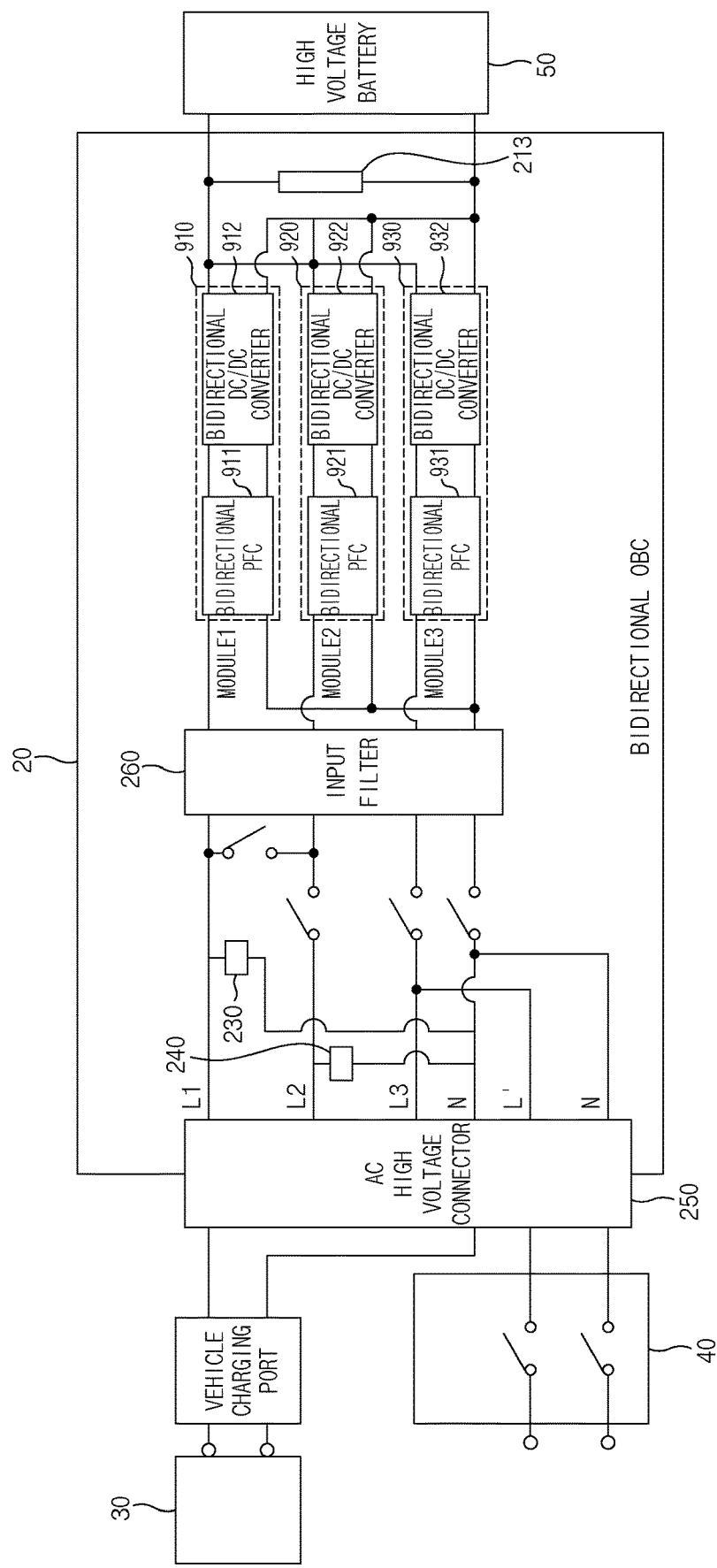
FIG. 10 is a circuit diagram illustrating the configuration of an apparatus for controlling a bidirectional OBC of an electric vehicle according to a sixth embodiment of the present disclosure.

FIG. 10 is a circuit diagram illustrating the configuration of an apparatus for controlling a bidirectional OBC of an electric vehicle according to a sixth embodiment of the present disclosure.

As shown in FIG. 10, the basic configuration is the same as that of the fifth embodiment, but the line L' for supplying power to the indoor power outlet 40 is branched from the line L3.

In this case, the controller 60 may control the first and second modules 910 and 920 to operate in the single-phase charging mode or the V2G mode, and may control the third module 930 to supply power to the electronic device connected to the indoor power outlet 40.

In this case, the controller 60 may control the first and second modules 910 and 920 to supply power to the electronic device connected to the outdoor power outlet 30 during the stop, and may control the third module 930 to supply power to the electronic device connected to the indoor power outlet 40.

Figure 11:
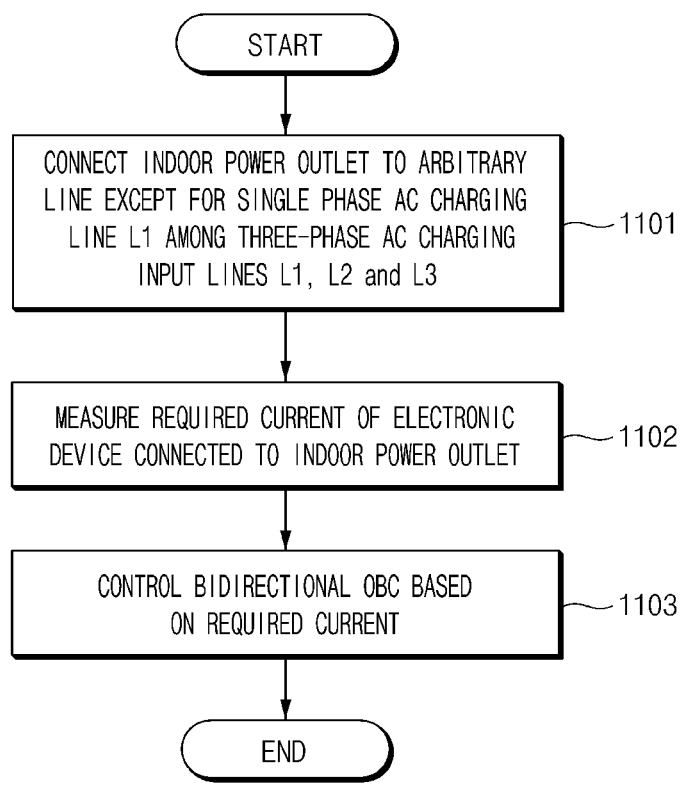
FIG. 11 is a flowchart illustrating a method of controlling a bidirectional OBC of an electric vehicle according to an embodiment of the present disclosure.

FIG. 11 is a flowchart illustrating a method of controlling a bidirectional OBC of an electric vehicle according to an embodiment of the present disclosure.

First, in operation 1101, the indoor power outlet 40 is connected to a line except for the single-phase AC charging line L1 among three-phase alternating current (AC) input lines L1, L2 and L3.

Thereafter, in operation 1102, the second current sensor 212 measures the required current of the electronic device connected to the indoor power outlet 40.

Thereafter, in operation 1103, the controller 60 controls the bidirectional OBC based on the required current.

Figure 12:
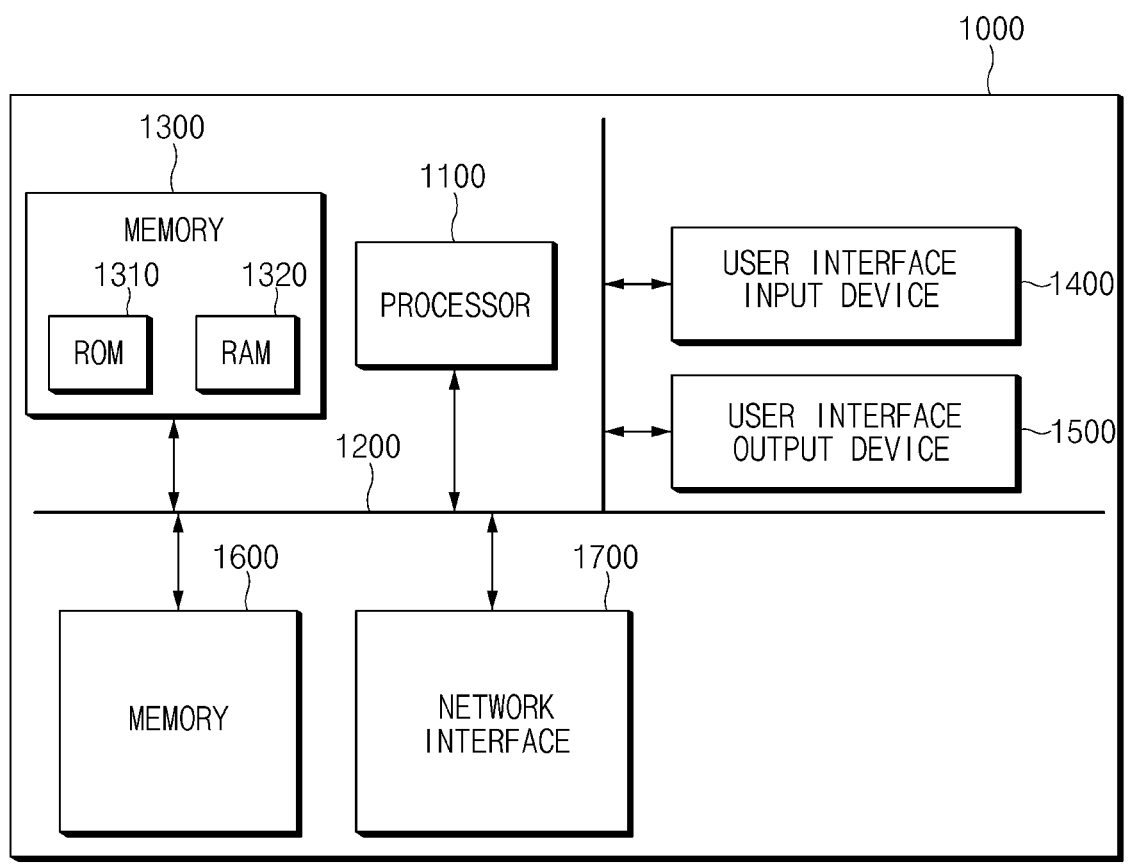
FIG. 12 is a block diagram illustrating a computing system for executing a method of controlling a bidirectional OBC of an electric vehicle according to each embodiment of the present disclosure.

FIG. 12 is a block diagram illustrating a computing system for executing a method of controlling a bidirectional OBC of an electric vehicle according to each embodiment of the present disclosure.

Referring to FIG. 12, a method of controlling a bidirectional OBC of an electric vehicle according to each embodiment of the present disclosure may also be implemented with a computing system. A computing system 1000 may include at least one processor 1100, a memory 1300, a user interface input device 1400, a user interface output device 1500, a memory (i.e., a storage) 1600, and a network interface 1700 connected through a system bus 1200.

The processor 1100 may be a central processing device (CPU) or a semiconductor device that processes instructions stored in the memory 1300 and/or the memory 1600. The memory 1300 and the memory 1600 may include various types of volatile or non-volatile storage media. For example, the memory 1300 may include a ROM (Read Only Memory) 1310 and a RAM (Random Access Memory) 1320.

Accordingly, the processes of the method or algorithm described in relation to the embodiments of the present disclosure may be implemented directly by hardware executed by the processor 1100, a software module, or a combination thereof. The software module may reside in a storage medium (that is, the memory 1300 and/or the memory 1600), such as a RAM, a flash memory, a ROM, an EPROM, an EEPROM, a register, a hard disk, solid state drive (SSD), a detachable disk, or a CD-ROM. The exemplary storage medium is coupled to the processor 1100, and the processor 1100 may read information from the storage medium and may write information in the storage medium. In another method, the storage medium may be integrated with the processor 1100. The processor and the storage medium may reside in an application specific integrated circuit (ASIC). The ASIC may reside in a user terminal. In another method, the processor and the storage medium may reside in the user terminal as an individual component.

As described above, according to the apparatus and method for controlling a bidirectional OBC of an electric vehicle of embodiments of the present disclosure, the line supplying power to the indoor power outlet of the electric vehicle is branched from a line except for a single-phase AC charging line among three-phase AC input lines, and the required current of the electronic device connected to the indoor power outlet is measured. In addition, the bidirectional OBC is controlled based on the required current, so that power can be supplied to the electronic device connected to the indoor power outlet while the electric vehicle operates in a charging mode or a V2G mode, and both the power consumption of the indoor power outlet and the power consumption of the outdoor power outlet can be improved.

Although exemplary embodiments of the present disclosure have been described for illustrative purposes, those skilled in the art will appreciate that various modifications, additions and substitutions are possible, without departing from the scope and spirit of the disclosure.

Therefore, the exemplary embodiments disclosed in the present disclosure are provided for the sake of descriptions, not limiting the technical concepts of the present disclosure, and it should be understood that such exemplary embodiments are not intended to limit the scope of the technical concepts of the present disclosure. The protection scope of the present disclosure should be understood by the claims below, and all the technical concepts within the equivalent scopes should be interpreted to be within the scope of the right of the present disclosure.

What is claimed is:

1. An apparatus for an electric vehicle, the apparatus comprising:
   an indoor power outlet configured to receive power through a line except for a single-phase alternating current (AC) charging line among three-phase AC input lines;
   a sensor configured to measure a required current of an electronic device connected to the indoor power outlet; and
   a controller configured to control a bidirectional on board charger of the electric vehicle based on the required current.

2. The apparatus of claim 1, wherein the bidirectional on board charger includes a three-phase bidirectional power factor corrector having six switches, wherein a first switch and a fourth switch form a first leg, a second switch and a fifth switch form a second leg, a third switch and a sixth switch form a third leg, the single-phase AC charging line is connected to the first leg, a second line of the three-phase AC input lines is connected to the second leg, and a third line of the three-phase AC input lines is connected to the third leg.

3. The apparatus of claim 2, wherein the controller is configured to control the first and fourth switches of the first leg and the third and sixth switches of the third leg to operate in a single-phase charging mode or a vehicle to grid (V2G) mode, and to control the second and fifth switches of the second leg to supply power to the electronic device connected to the indoor power outlet while operating in the single-phase charging mode or the V2G mode when the indoor power outlet receives power through the second line.

4. The apparatus of claim 3, wherein the controller is configured to control the second and fifth switches of the second leg while being synchronized with a phase of a voltage applied through the single-phase AC charging line.

5. The apparatus of claim 2, further comprising:
   an outdoor power outlet configured to receive power through the single-phase AC charging line; and
   a sensor configured to measure required power of an electronic device connected to the outdoor power outlet; and
   wherein the controller is configured to control the first and fourth switches of the first leg and the third and sixth switches of the third leg to supply power to the electronic device connected to the outdoor power outlet, and to control the second and fifth switches of the second leg to supply power to the electronic device connected to the indoor power outlet when the indoor power outlet receives power through the second line.

6. The apparatus of claim 1, wherein the bidirectional on board charger includes a three-phase bidirectional power factor corrector having eight switches, wherein a first switch and a fourth switch form a first leg, a second switch and a fifth switch form a second leg, a third switch and a sixth switch form a third leg, a seventh switch and an eighth switch form a fourth leg, the single-phase AC charging line is connected to the first leg, a second line of the three-phase AC input lines is connected to the second leg, a third line of the three-phase AC input lines is connected to the third leg, and an N-phase line is connected to the fourth leg.

7. The apparatus of claim 6, wherein the controller is configured to control the first and fourth switches of the first leg and the seventh and eighth switches of the fourth leg to operate in a single-phase charging mode or a vehicle to grid (V2G) mode, and to control the second and fifth switches of the second leg to supply power to the electronic device connected to the indoor power outlet while operating in the single-phase charging mode or the V2G mode when the indoor power outlet receives power through the second line.

8. The apparatus of claim 7, wherein the controller is configured to control the second and fifth switches of the second leg while being synchronized with a phase of a voltage applied through the single-phase AC charging line.

9. The apparatus of claim 6, further comprising:
   an outdoor power outlet configured to receive power through the single-phase AC charging line; and
   a sensor configured to measure required power of an electronic device connected to the outdoor power outlet; and
   wherein the controller is configured to control the first and fourth switches of the first leg and the seventh and eighth switches of the fourth leg to supply power to the electronic device connected to the outdoor power outlet, and to control the second and fifth switches of the second leg to supply power to the electronic device connected to the indoor power outlet when the indoor power outlet receives power through the second line.

10. The apparatus of claim 6, wherein the controller is configured to control the first and fourth switches of the first leg, the second and fifth switches of the second leg, and the seventh and eighth switches of the fourth leg to operate in a single-phase charging mode or a vehicle to grid (V2G) mode, and to control the third and sixth switches of the third leg to supply power to the electronic device connected to the indoor power outlet while operating in the single-phase charging mode or the V2G mode when the indoor power outlet receives power through the third line.

11. The apparatus of claim 10, wherein the controller is configured to control the second and fifth switches of the second leg while being synchronized with a phase of a voltage applied through the single-phase AC charging line.

12. The apparatus of claim 6, further comprising:
    an outdoor power outlet configured to receive power through the single-phase AC charging line; and
    a sensor configured to measure required power of an electronic device connected to the outdoor power outlet; and
    wherein the controller is configured to control the first and fourth switches of the first leg, the second and fifth switches of the second leg, and the seventh and eighth switches of the fourth leg to supply power to the electronic device connected to the outdoor power outlet, and to control the third and sixth switches of the third leg to supply power to the electronic device connected to the indoor power outlet when the indoor power outlet receives power through the third line.

13. A vehicle comprising:
    a high voltage battery;
    a bidirectional on board charger;
    a vehicle power outlet configured to receive power from the high voltage battery through a line except for a single-phase alternating current (AC) charging line among three-phase AC input lines;
    a sensor configured to measure a required current for an electronic device to be connected to the vehicle power outlet; and
    a controller configured to control the bidirectional on board charger based on the required current.

14. The vehicle of claim 13, wherein the bidirectional on board charger includes a three-phase bidirectional power factor corrector having six switches, wherein a first switch and a fourth switch form a first leg, a second switch and a fifth switch form a second leg, a third switch and a sixth switch form a third leg, the single-phase AC charging line is connected to the first leg, a second line of the three-phase AC input lines is connected to the second leg, and a third line of the three-phase AC input lines is connected to the third leg.

15. The vehicle of claim 14, wherein the controller is configured to control the first and fourth switches of the first leg and the third and sixth switches of the third leg to operate in a single-phase charging mode or in a vehicle to grid (V2G) mode.

16. The vehicle of claim 15, wherein the controller is configured to control the second and fifth switches of the second leg to supply power to the electronic device connected to the indoor power outlet when operating in the single-phase charging mode or in the V2G mode.

17. The vehicle of claim 16, wherein the controller is configured to synchronize the second and fifth switches of the second leg with a phase of a voltage applied to the single-phase AC charging line.

18. The vehicle of claim 14, further comprising:
a module power outlet configured to receive power through the single-phase AC charging line; and
a sensor configured to measure required power of an electronic device to be connected to the module power outlet,
wherein the controller is configured to control the first and fourth switches of the first leg and the third and sixth switches of the third leg to supply power to the electronic device connected to the module power outlet, and to control the second and fifth switches of the second leg to supply power to the electronic device connected to the vehicle power outlet when the vehicle power outlet receives power through the second line.

* * * * *